(12) United States Patent
Braun et al.

(10) Patent No.: US 11,064,441 B2
(45) Date of Patent: Jul. 13, 2021

(54) OBTAINING AND PROCESSING INFORMATION RELATED TO A MOBILE DEVICE ACCESSORY THAT INCLUDES A BATTERY

(71) Applicant: The Code Corporation, Draper, UT (US)

(72) Inventors: Jennifer Braun, Draper, UT (US); John Deal, Springfield, PA (US)

(73) Assignee: The Code Corporation, Murray, UT (US)

(*) Notice: Subject to any disclaimer, the term of this patent is extended or adjusted under 35 U.S.C. 154(b) by 40 days.

(21) Appl. No.: 16/437,385

(22) Filed: Jun. 11, 2019

(65) Prior Publication Data

US 2020/0396689 A1 Dec. 17, 2020

(51) Int. Cl.
| | |
|---|---|
| *H04W 52/02* | (2009.01) |
| *G06F 1/16* | (2006.01) |
| *H04M 1/02* | (2006.01) |
| *H04W 4/20* | (2018.01) |
| *H01M 10/42* | (2006.01) |
| *H01M 10/48* | (2006.01) |
| *H04W 4/029* | (2018.01) |

(52) U.S. Cl.
CPC ...... *H04W 52/0296* (2013.01); *G06F 1/1632* (2013.01); *H01M 10/4257* (2013.01); *H01M 10/488* (2013.01); *H04M 1/0274* (2013.01); *H04W 4/029* (2018.02); *H04W 4/20* (2013.01); *H01M 2010/4278* (2013.01); *H01M 2220/30* (2013.01)

(58) Field of Classification Search
CPC ... H04W 52/0296; H04W 4/029; H04W 4/20; H01M 10/488; H01M 10/4257; H01M 1/0274; H01M 2220/30; H01M 2010/4278; G06F 1/1632
USPC .......................................... 455/575, 566, 419
See application file for complete search history.

(56) References Cited

U.S. PATENT DOCUMENTS

| | | | |
|---|---|---|---|
| 2007/0155441 A1* | 7/2007 | Carbonaro .......... | H04W 52/265 455/571 |
| 2012/0303520 A1* | 11/2012 | Huang ................. | H01M 10/46 705/39 |
| 2014/0192481 A1* | 7/2014 | Wojcik ................ | H05K 5/0086 361/679.55 |
| 2014/0357313 A1* | 12/2014 | Mercer ................ | H04W 24/06 455/552.1 |
| 2015/0207631 A1* | 7/2015 | Bolton ................ | G06F 13/387 726/9 |
| 2015/0220766 A1* | 8/2015 | Russell .............. | G06K 7/10881 235/462.42 |
| 2019/0004118 A1* | 1/2019 | Eichelberger ...... | G01R 31/3651 |
| 2019/0033395 A1* | 1/2019 | Karner ................. | H02J 7/0047 |

(Continued)

*Primary Examiner* — Farid Seyedvosoghi
(74) *Attorney, Agent, or Firm* — Timothy P. O'Hagan; Ray Quinney & Nebeker

(57) ABSTRACT

An accessory for a mobile device includes a battery pack comprising a battery, battery pack memory, and battery data stored in the battery pack memory. The battery is an auxiliary power source for the mobile device when the accessory is electrically coupled to the mobile device. The accessory additionally includes accessory memory and accessory data stored in the accessory memory. The accessory data and the battery data may be obtained by the application on the mobile device when the accessory is electrically coupled to the mobile device.

15 Claims, 11 Drawing Sheets

(56) References Cited

U.S. PATENT DOCUMENTS

2019/0036178 A1* 1/2019 Karner .................. G06F 3/0484
2019/0327682 A1* 10/2019 McLellan ............. H04W 4/029

* cited by examiner

OBTAINING AND PROCESSING INFORMATION RELATED TO A MOBILE DEVICE ACCESSORY THAT INCLUDES A BATTERY

CROSS-REFERENCE TO RELATED APPLICATIONS

N/A

BACKGROUND

Many different types of mobile devices are in widespread use today, most often in connection with entertainment, communications, and office productivity. Some examples of mobile devices include smartphones, tablet computers, laptop computers, barcode readers, portable media players, digital cameras, camcorders, and GPS navigation devices. Mobile devices may be used to perform a wide variety of tasks, such as accessing websites via the Internet, playing games, composing and sending text and/or email messages, watching videos, listening to music, and so forth.

There are many different types of accessories that may be used with mobile devices. As just one example, an accessory may include a battery that serves as an auxiliary power source for a mobile device. The accessory may include a power and data connector that couples to a corresponding power and data connector of the mobile device. The accessory may be configured so that when the mobile device is not connected to a direct current (DC) power source and the internal battery of the mobile device becomes depleted, the mobile device receives power from the battery pack of the accessory. Thus, the accessory may perform the function of extending the life of the mobile device's internal battery.

It may be desirable to determine information about the battery pack within an accessory and/or about the accessory itself. For example, it may be desirable to determine information about the age of the battery pack (e.g., when the battery pack was deployed) or about the health of the battery pack (e.g., how much of the original capacity remains), in order to see whether the battery pack should be replaced soon. It may also be desirable to determine identification information such as the serial number of the battery pack and/or the serial number of the accessory. It can, however, be difficult to determine such information. For example, the serial number of the accessory may be printed on an interior portion of the accessory so that it is protected from cleaning chemicals. The serial number of the battery may similarly be hidden from view.

It can be particularly challenging to determine information about accessories and corresponding battery packs in an organization that has a large number of mobile devices and corresponding accessories that are used by individuals in the organization.

SUMMARY

In accordance with one aspect of the present disclosure, an accessory for a mobile device is disclosed. The mobile device includes an application. The accessory may include a battery pack including a battery, battery pack memory, and battery data stored in the battery pack memory. The accessory may also include accessory memory and accessory data stored in the accessory memory. The battery may be an auxiliary power source for the mobile device when the accessory is electrically coupled to the mobile device. The accessory data and the battery data may be obtained by the application on the mobile device when the accessory is electrically coupled to the mobile device.

The battery data may include at least one of a deployment date of the battery pack, a battery health indicator, or a serial number of the battery pack. The accessory data may include a serial number of the accessory.

The battery pack may further include a battery pack power and data connector. The accessory may further include an accessory power and data connector that is configured to be coupled to the battery pack power and data connector.

The mobile device may further include a mobile device power and data connector. The accessory may further include an accessory power and data connector that is configured to be coupled to the mobile device power and data connector.

The application may directly access the battery data in the battery pack memory and directly access the accessory data in the accessory memory.

The accessory may further include an agent stored in the accessory memory. The agent may be executable by one or more processors to provide the battery data and the accessory data to the application.

The accessory may include a protective case that encloses the mobile device. The battery in the battery pack may be replaceable without having to remove the mobile device from the protective case.

In accordance with another aspect of the present disclosure, a mobile device is disclosed that includes one or more processors, memory in electronic communication with the one or more processors, and an application stored in the memory. The application may be executable by the one or more processors to obtain battery data and accessory data from an accessory that comprises a battery pack, cause the battery data and the accessory data to be displayed on a display screen of the mobile device, and cause the battery data and the accessory data to be sent to a process management server.

The application may be additionally executable by the one or more processors to cause time and location data that is associated with the battery data and the accessory data to be sent to the process management server.

The battery data may include at least one of a deployment date of the battery pack, a battery health indicator, or a serial number of the battery pack. The accessory data may include a serial number of the accessory.

The battery pack may include battery pack memory. The application may be further executable by the one or more processors to receive user input including a deployment date of the battery pack and cause the deployment date to be written to the battery pack memory.

In accordance with another aspect of the present disclosure, a process management server is disclosed that includes one or more processors, memory in electronic communication with the one or more processors, and instructions stored in the memory. The instructions may be executable by the one or more processors to receive battery data and accessory data from a plurality of applications running on a plurality of mobile devices, receive a request for data that is related to a plurality of accessories used by the plurality of mobile devices, and provide at least some portion of the battery data and the accessory data in response to the request.

The instructions may be additionally executable by the one or more processors to receive time and location data from the plurality of applications and provide at least some portion of the time and location data in response to the request. The time and location data may be associated with the battery data and the accessory data.

The process management server may further include additional instructions that are executable by the one or more processors to aggregate at least some of the battery data, the accessory data, and the time and location data that is received from the plurality of applications, thereby creating aggregated data. The additional instructions may also be executable by the one or more processors to determine a metric that is related to the aggregated data and provide a report that comprises the metric.

The metric may include at least one of an average battery age or an average value for a battery health indicator. The report may include a visual representation of the metric.

The battery data received from an application running on a mobile device may include at least one of a deployment date of a battery pack that is included within an accessory that is connected to the mobile device, a battery health indicator, or a serial number of the battery pack. The accessory data received from an application running on a mobile device may include a serial number of an accessory that is connected to the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
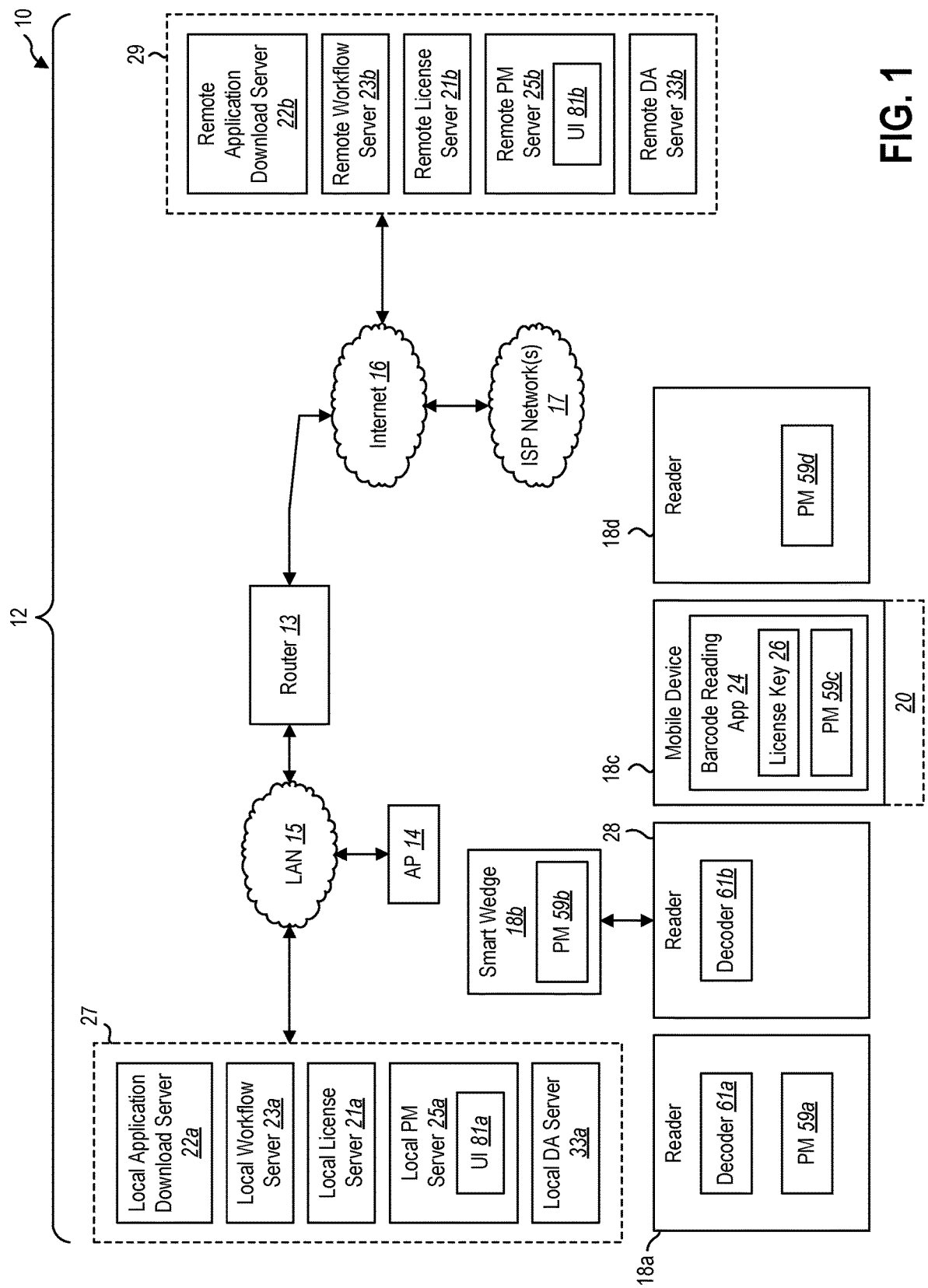
FIG. 1 depicts an example of a system in which embodiments of the present disclosure may be utilized.

FIG. 1 depicts an example of a system 10 in which embodiments of the present disclosure may be utilized. The system 10 includes process management input devices 18a-d. At least some of the process management input devices 18a-d may include barcode reading functionality and may be configured to read barcodes and provide decoded data to workflow servers 23a-b. In conjunction with reading barcodes, the process management input devices 18a-d may also generate auxiliary data for auxiliary process management systems 25a-25b and/or aggregation systems 33a-33b.

The workflow servers 23a-b include a local workflow server 23a and a remote workflow server 23b. The workflow servers 23a-b may be configured to use decoded data received from the process management input devices 18a-d to track, manage, and document a workflow process.

In one embodiment, the workflow servers 23a-b may support a retail sales workflow wherein a barcode reader attached to a point-of-sale (POS) system may be used to identify products being purchased by reading barcodes (e.g., Universal Product Code (UPC) barcodes) associated with the products. The workflow servers 23a-b may be used to determine price information associated with products, track inventory of products, automate ordering of new products, etc. As just one example, the data within a particular barcode may include a product identifier (ID) for the corresponding product. The barcode reader may send the product ID to a workflow server. Upon receiving the product ID, the workflow server may look up the product price for the POS system to complete the sale.

In one embodiment, the workflow servers 23a-b may be part of a hospital or other healthcare provider's electronic health record system. Data within barcodes on equipment, consumables, medications, and/or patient wristbands may be used to record medical operations such as disbursement of medications and use of equipment and/or consumables within the electronic health record systems.

In one embodiment, the workflow servers 23a-b may be part of a manufacturer's assembly line. Data within barcodes on components may be read and used to identify components (e.g., by a part number common across all components or by a serial number identifying each component individually), track inventory, associate components with final assemblies, etc.

In one embodiment, the workflow servers 23a-b may be part of a provider's system for verifying the age of purchasers of age restricted items such as alcohol or tobacco products. A barcode on an individual's ID card may be read for verification of the individual's age and the workflow servers 23a-b may retain certain identification information for the duration of time required by applicable law.

The process management servers 25a-25b include a local process management server 25a and a remote process management server 25b. The process management servers 25a-25b may use: i) certain portions of the data encoded in, and read from, the barcodes; and/or ii) auxiliary data generated during the process of reading the barcodes to evaluate and improve efficiency of the workflow.

The data aggregation servers 33*a*-33*b* include a local data aggregation server 33*a* and a remote data aggregation server 33*b*. The data aggregation servers 33*a*-33*b* may use: i) certain portions of the data encoded in, and read from, the barcodes; and/or ii) auxiliary data generated during the process of reading the barcodes to aggregate non-personally identifiable statistical data regarding the workflow or multiple workflows.

In one embodiment, the process management servers 23*a*-*b* and/or data aggregation servers 25*a*-25*b* may obtain information about the quality of each barcode being read (e.g., print quality). This quality information may be aggregated and statistics may be calculated. Upon reviewing these statistics, certain information or trends may become apparent. For example, it may become apparent that certain products have better printed barcodes than other products or that the quality of printing is deteriorating over time on a certain barcode.

In a related embodiment, the process management servers 25*a*-*b* and/or data aggregation servers 33*a*-*b* may obtain information about the quality of each barcode being read by multiple barcode readers. As such quality information is aggregated and statistics are calculated, it may become apparent that certain barcodes appear to be of better quality in one reader over another reader so that it can be concluded that one reader is capturing clearer images. The reader that is capturing the less clear images may be checked for damage such as a scratched or dirty imaging window.

In one embodiment, the process management servers 25*a*-*b* may track the location of each replaceable battery pack used on barcode readers or other data capture devices as part of the workflow. The age and diminished health (e.g., diminished charge capacity) may be tracked.

In one embodiment, the process management servers 25*a*-*b* and/or data aggregation servers 33*a*-*b* may track metadata associated with each barcode read. The metadata may be analyzed and used for measuring efficiency of the workflow and/or equipment or individuals participating in the workflow. Metadata may include location of the barcode read, the user of the barcode reader, a timestamp of the barcode read, etc.

The system 10 includes a network 12 via which barcode data and the auxiliary data are provided from the process management input devices 18*a*-*d* to the applicable workflow servers 23*a*-*b*, process management servers 25*a*-25*b*, and data aggregation servers 33*a*-33*b*. The network 12 may be expansive including one or more local area networks (LAN) 15, the Internet 16, and one or more wired or wireless Internet service provider (ISP) networks 17.

Each LAN 15 may use any known network technologies such as Ethernet and TCP/IP protocols to interconnect various systems. Each LAN 15 may further include at least one wireless access point 14 enabling wireless LAN communications with various systems utilizing known technologies such as Wi-Fi™ (IEEE 802.11).

The system 10 shown in FIG. 1 includes a single LAN 15. The LAN 15 may be coupled to the Internet 16 via a router 13. Although FIG. 1 depicts the LAN 15 coupled to the Internet 16 via a single router 13, such connections may employ multiple routers and firewall systems, including demilitarized zone (DMZ) networks.

For purposes of illustration, the systems interconnected by the LAN 15 may include the local workflow server 23*a*, the local process management server 25*a*, the local data aggregation server 33*a*, and various process management input devices 18*a*-*d*.

Coupling the LAN 15 to the Internet 16 enables the system 10 to include and interconnect remote workflow server(s) 23*b*, remote process management server(s) 25*b*, remote data aggregation server(s) 33*b*, and various other process management input devices 18*a*-*d* via one or more wired or wireless ISP networks 17.

The remote devices (e.g., devices coupled to the Internet 16) may be logically connected to the LAN 15 using Virtual Private Network (VPN) technology. As such, a mobile device (e.g., mobile device 18*d*) coupled to communicate with the wireless ISP network 17 utilizing WAN communications may, utilizing a VPN technology, be an endpoint on the LAN 15.

The process management input devices 18*a*-*d* may include combinations of smart barcode readers 18*a*, smart wedges 18*b*, mobile devices 18*c*, and non-barcode reading process data input devices 18*d*. Each of the process management input devices 18*a*-*d* may be configured to perform one or more process management operations. The process management operations may include determining auxiliary data corresponding to a workflow process. The auxiliary data may include metadata that is generated in connection with reading one or more barcodes during the workflow process. The process management operations may also include sending the auxiliary data to one or more servers, such as the process management servers 25*a*-25*b* and/or the data aggregation servers 33*a*-33*b*. To enable the process management input devices 18*a*-*d* to perform process management operations, each of the process management input devices 18*a*-*d* may include code (which may be referred to herein as process management code) that is stored in memory and executable by one or more processors to perform process management operations.

In general, a smart barcode reader 18*a* may be configured to perform process management operations in addition to having barcode reading capability. In other words, in addition to reading barcodes and outputting decoded data for the workflow servers 23*a*-*b*, a smart barcode reader 18*a* may also be configured to generate auxiliary data for use by the process management servers 25*a*-25*b* and/or data aggregation servers 33*a*-33*b*. In addition to a decoder 61*a*, the smart barcode reader 18*a* is also shown with process management code 59*a* that enables the smart barcode reader 18*a* to perform process management operations.

In general, a smart wedge device 18*b* is configured to be connected to a traditional barcode reader 28 that is not capable of performing process management operations. The smart wedge device 18*b* may be configured to perform one or more process management operations related to the barcode reading operations that are performed by the barcode reader 28. For example, a smart wedge device 18*b* may be configured to: i) couple to, and receive decoded barcode data from, a traditional barcode reader 28; ii) forward the decoded data to the applicable workflow server; iii) generate auxiliary data in relation to the forwarded decoded data; and iv) provide a combination of portions of the decoded data and/or the auxiliary data to one or more of the process management servers 25*a*-25*b* and/or data aggregation servers 33*a*-33*b*. In FIG. 1, the traditional barcode reader 28 is shown with a decoder 61*b*, and the smart wedge device 18*b* is shown with process management code 59*b*.

The term "mobile device," as the term is used in this patent specification and the accompanying claims will be used to describe a portable, hand-held computing device. A mobile device may include a camera. Some examples of mobile devices include smartphones, tablet computers, and hybrid tablet/smartphone devices (which are often nicknamed "phablets").

A mobile device 18c may include a barcode reading application 24 that enables the mobile device 18c to perform barcode reading operations. For example, the barcode reading application 24 may utilize a camera of the mobile device 18c to capture an image of a barcode. The barcode reading application 24 may also include a decoder that processes the captured image in order to decode the barcode. In addition to performing barcode reading operations, the barcode reading application 24 may also be configured to perform one or more process management operations. FIG. 1 shows the barcode reading application 24 with process management code 59c for providing this functionality. In operation, the barcode reading application 24 may i) utilize a camera of the mobile device 18c to read barcodes; ii) provide the decoded data to the applicable workflow server; iii) generate auxiliary data in relation to the barcode read and/or in relation to the decoded data; and iv) provide a combination of portions of the decoded data and/or the auxiliary data to one or more of the process management servers 25a-b and/or data aggregation servers 33a-33b.

In general, a non-barcode reading process management input device 18d does not have barcode reading capability but is capable of performing process management operations. For example, the non-barcode reading process management input device 18d may be configured to generate auxiliary data in relation to the workflow and provide the auxiliary data to one or more of the process management servers 25a-25b and/or data aggregation servers 33a-33b. The auxiliary data generated by a non-barcode reading process management input device 18d may: i) relate to the workflow in which other process management input devices 18a-18c provide decoded barcode data as part of the workflow; and/or ii) relate to the barcode data read by the other process management input devices 18a-18c as part of the workflow.

Figure 2:
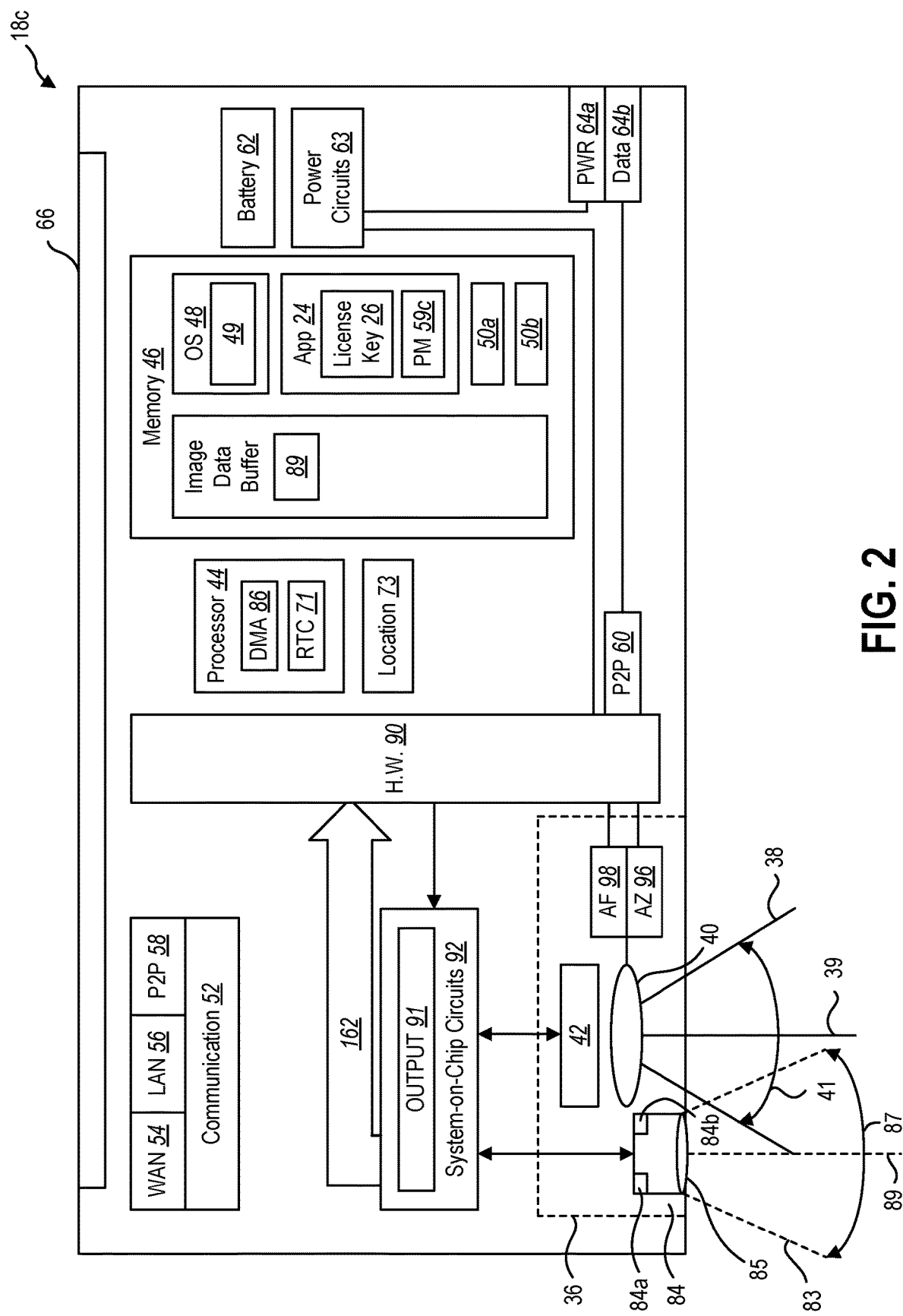
FIG. 2 illustrates an example of a mobile device that may be used in the system of FIG. 1.

FIG. 2 illustrates an example of a mobile device 18c that may be used in the system 10 of FIG. 1. Referring to FIG. 2 in conjunction with FIG. 1, each mobile device 18c may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize one or more wireless local area communication protocols for communication with a wireless access point 14 of a wireless portion of a LAN 15. The mobile device 18c itself may be an addressable endpoint on the LAN 15. In other words, the mobile device 18c may be assigned an IP address and may be capable of IP communications with other devices over the LAN 15 using IP protocols such as Transmission Connection Protocol (TCP), Uniform Datagram Protocol (UDP), etc. The wireless access point 14 and the LAN communications module 56 may function in accordance with any known wireless communications protocol(s), including but not limited to the IEEE 802.11 standards, which are sometimes referred to as Wi-Fi™.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN). Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE)), Fourth Generation (4G) standards (e.g., LTE, Mobile WiMAX), Fifth Generation (5G) standards, and/or subsequently developed standards. The wireless ISP network 17 may assign an IP address to the mobile device 18c such that the mobile device 18c may be capable of IP communications with other devices over the wireless ISP network 17 using IP protocols such as TCP, UDP, or the like.

The mobile device 18c may include a processor 44 and memory 46 in electronic communication with the processor 44. The processor 44 may be embodied as a combination of one or more microprocessors, microcontrollers, digital signal processors (DSP), or the like. When operating, the processor 44 may execute instructions (in the form of an operating system 48 and/or applications) stored in the memory 46. The memory 46 may be any component capable of storing electronic information (including an operating system 48 and/or application instructions executable by the processor 44), and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, a barcode-reading application 24 (which may include a process management module 59c and a license key 26), one or more other applications 50a, 50b, and a data buffer including an image data buffer 89.

In operation, the processor 44 may execute instructions embodied in the operating system 48, the barcode-reading application 24, and each of the other applications 50a, 50b. The processor 44 may further include a real-time clock 71 to enable the mobile device 18c to determine the time at which a barcode is read.

Hardware circuits 90 interface the processor 44 with peripheral systems including, but not limited to, a (multi-touch) display screen 66, a wireless communication system 52, a hardwired point-to-point communication interface 60, a camera 36, and other peripheral systems, including auxiliary data input systems such as a GPS location system 73 or other system for determining the location of the mobile device 18c.

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector such as a USB connector or an Apple® Lightning Connector®).

The camera 36 may include a (color) image sensor 42 (i.e., an array of photosensitive elements). The image sensor 42 may be positioned parallel to each of the face surface and the back surface of the mobile device 18. The camera 36 may also include a lens assembly 40 with an optical axis 39 orthogonal to the image sensor 42 and defining a center line of a camera field of view 38 extending outward from the back surface of the mobile device 18. The image sensor 42 may take the form of a charge-coupled display (CCD) image sensor, a complementary metal-oxide-semiconductor (CMOS) image sensor, or the like.

The lens assembly 40 may receive light reflected from objects within the field of view 38 of the camera 36, which may be referred to herein as the camera field of view 38. The camera field of view 38 may have an angular size 41 which may be the angle at which the camera field of view 38 spreads with respect to distance from the lens assembly 40. The lens assembly 40 may have a camera aperture size measured as an f-number, which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the image sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the image sensor 42.

The image sensor 42 may be coupled to system-on-chip control circuits 92. In one embodiment, the control circuits 92 may control the operation of the image sensor 42 (e.g., exposure, gain, and coupling of pixels to analog-to-digital (A/D) converters for image read out), format the digital intensity values of each pixel of the image sensor 42 for color image output, and make the color image output available for writing to the image data buffer 89.

In another embodiment, the control circuits 92 may include output module 91 which may perform image processing on images captured by the image sensor 42. Control of the image sensor 42 and image pre-processing that may be performed by the system on chip circuits 92 are described in more detail in U.S. patent application Ser. No. 14/717,112, titled "BARCODE READER" and filed on May 20, 2015, which is hereby incorporated by reference in its entirety (hereinafter, the "'112 application"). As such, the digital image output 162 (which may be the color image or a result of processing the image one or more times in accordance with the teachings of the '112 application) may be written to the image data buffer 89. The mobile device 18c may include a direct memory access (DMA) system 86 which may be a part of the processor 44. The DMA system 86 provides for direct writing of the digital image output 162 from the camera 36 to the image data buffer 89.

The camera 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500 K representing a warm color "white," such as that of candlelight, and 9500 K representing a cool color "white," such as that of a blue sky. The exemplary white LED may be within this range. Alternatively, the exemplary white LED may have a color between 4000 K and 7000 K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface and having an illumination axis perpendicular to the back surface and an illumination angle 87 which substantially coincides with the field of view 38 of the camera 36. In operation, the system-on-chip circuits 92 may control each LED 84a, 84b independently. The system-on-chip circuits 92 may also control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

The mobile device 18c may further include a battery 62 and power circuits 63. In general the power circuits 63 control charging of the battery 62 from power received from an external power source via the power connector 64a. The power circuits 63 also provide operating power at the voltage and current drawing requirements of the various components of the mobile device 18c from the power received from the battery 62 or the external power source (when connected to the external power source).

Another aspect of the present disclosure is related to a scenario in which an accessory is used with a mobile device. The accessory may include a battery that serves as an auxiliary power source for the mobile device when the accessory is electrically coupled to the mobile device. The mobile device may include an application that obtains data about the battery (battery data) and/or data about the accessory (accessory data) when the accessory is electrically coupled to the mobile device. The application may cause the battery data and/or the accessory data to be displayed on a display screen of the mobile device. The application may also cause the battery data and/or the accessory data to be sent to a process management server, along with time and location data that indicates when and where the battery data and the accessory data was obtained.

The process management server may receive battery data, accessory data, and time and location data from a plurality of applications running on a plurality of mobile devices. The process management server may make at least some of the battery pack data, the accessory data, and the time and location data available to interested entities.

The process management server may process the battery pack data, the accessory data, and/or the time and location data in order to determine additional information related to the accessories and/or the battery packs contained in the accessories. In an example, the process management server may aggregate the battery pack data that is received from the applications. The process management server may also determine metrics that are related to the aggregated battery pack data and provide reports that include the metrics. The reports may include visual representations of the metrics.

Figure 3:
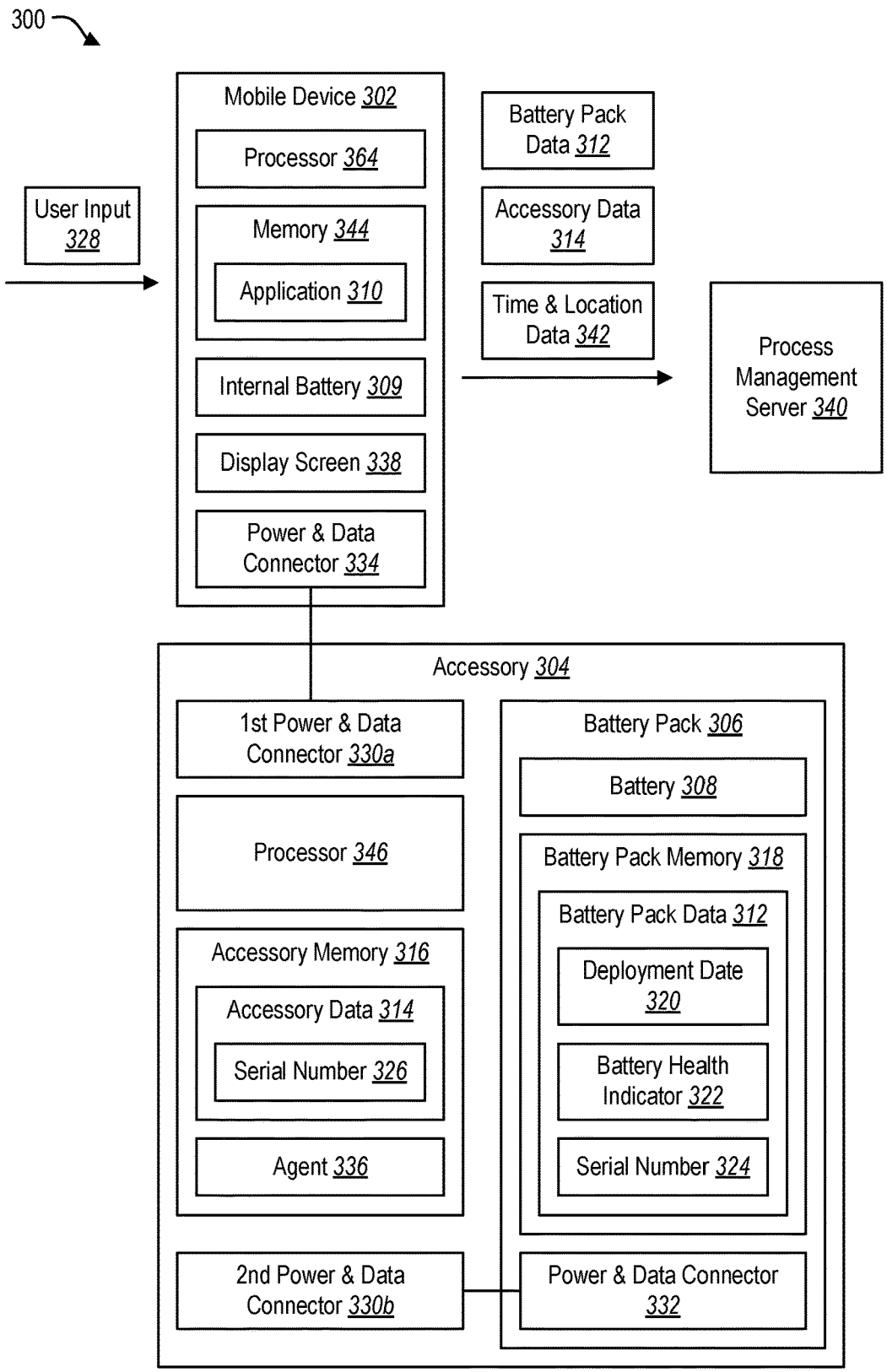
FIG. 3 illustrates an example of a system in which an application running on a mobile device obtains battery data and accessory data from an accessory that is electrically coupled to the mobile device.

FIG. 3 illustrates an example of a system 300 that includes a mobile device 302 and an accessory 304 that may be electrically coupled to the mobile device 302. The mobile device 302 shown in FIG. 3 may include some or all of the components and/or characteristics that were described above in connection with the mobile device 18c shown in FIGS. 1 and 2.

The accessory 304 includes a battery pack 306. The battery pack 306 includes a battery 308 that may serve as an auxiliary power source for the mobile device 302 when the accessory 304 is electrically coupled to the mobile device 302. In an example, the accessory 304 may be configured so that the mobile device 302 may receive power from the battery 308 in the battery pack 306 within the accessory 304 for operation of the mobile device 302 and/or for maintaining the charge of a battery internal to the mobile device 302. The battery 308 may also provide power to the accessory 304.

The battery 308 may be rechargeable. There are many different types of rechargeable batteries that may be used in the battery pack 306 (e.g., lithium-ion, lithium-ion polymer, nickel-cadmium, nickel-metal hydride, etc.).

The mobile device 302 includes an application 310. The application 310 may include some or all of the characteristics of the applications 50a-b that were described above in connection with FIG. 2.

The application 310 may be configured to obtain battery pack data 312 and accessory data 314 from the accessory 304. The accessory 304 may include memory 316, which may be referred to herein as accessory memory 316. The accessory data 314 may be stored within the accessory memory 316. Similarly, the battery pack 306 may include memory 318, which may be referred to herein as battery pack memory 318. The battery pack data 312 may be stored within the battery pack memory 318. The accessory data 314 and the battery pack data 312 may be accessible to the application 310 when the battery pack 306 is contained within the accessory 304 and the accessory 304 is electrically coupled to the mobile device 302.

There are many different kinds of battery pack data 312 and accessory data 314 that the application 310 may obtain from the accessory 304 in accordance with the present disclosure. In general terms, the battery pack data 312 may include information about the battery pack 306, and the accessory data 314 may include information about the accessory 304. In an example, the battery pack data 312 may include a deployment date 320 of the battery pack 306, a battery health indicator 322, and/or a serial number 324 of the battery pack 306. The accessory data 314 may include a serial number 326 of the accessory 304.

The deployment date 320 of the battery pack 306 may be the date that the battery pack 306 in the accessory 304 goes into service. In an example, the deployment date 320 can be manually entered into the application 310. For instance, the application 310 may receive user input 328 that includes the deployment date 320. In response to receiving this user input 328 the application 310 may cause the deployment date 320 to be written to the battery pack memory 318. In another example, the deployment date 320 can indicate when the battery 308 within the battery pack 306 has completed a predefined number of charge/discharge cycles.

The battery health indicator 322 may provide information about the condition of the battery 308 within the battery pack 306. Many batteries (e.g., batteries that are based on lithium ion technology) typically only have a finite number of charge/discharge cycles before their lifetime starts to become significantly reduced for a given level of charge. The battery health indicator 322 may include some measure of the current capacity of the battery 308 at full charge relative to the original capacity of the battery 308 at full charge. There are many different ways that such information may be expressed. For instance, the battery health indicator 322 may be expressed as the number of charge/discharge cycles that the battery 308 has experienced. Alternatively, or in addition, the battery health indicator 322 may be expressed as the number of charge/discharge cycles that the battery 308 has remaining before the lifetime of the battery 308 is expected to drop below some threshold value, which may be a predefined percentage of its original lifetime. Alternatively, or in addition, the battery health indicator 322 may be expressed as a percentage of the original lifetime. In other words, battery health indicator 322 may be reported as N % (where N may be any positive integer or decimal value between 0 and 100), meaning that at its current full charge the battery 308 has N % of its original lifetime.

As indicated above, the accessory data 314 and the battery pack data 312 are accessible to the application 310 when the battery pack 306 is contained within the accessory 304 and the accessory 304 is electrically coupled to the mobile device 302. To enable the accessory 304 to be electrically coupled to the battery pack 306 and to the mobile device 302, the accessory 304 may include at least two power and data connectors 330a-b. A first power and data connector 330a may be configured to be coupled to a corresponding power and data connector 334 in the mobile device 302. A second power and data connector 330b may be configured to be coupled to a corresponding power and data connector 332 in the battery pack 306.

The term "power and data connector" may refer to an interface through which both power and data may be transferred. Some examples of power and data connectors include the family of Universal Serial Bus (USB) connectors (e.g., micro, mini, standard) and the Apple® Lightning Connector®. However, these specific examples should not be interpreted as limiting the scope of the present disclosure. Other types of power and data connectors may be used in accordance with the systems and methods disclosed herein.

There are several different ways that the application 310 may obtain the battery pack data 312 and the accessory data 314 from the accessory 304. For example, when the accessory 304 is electrically coupled to the battery pack 306 (e.g., when the second power and data connector 330b is coupled to the power and data connector 332 of the battery pack 306) and the accessory 304 is also electrically coupled to the mobile device 302 (e.g., when the first power and data connector 330a is coupled to the power and data connector 334 of the mobile device 302), the application 310 may be capable of directly accessing the accessory data 314 in the accessory memory 316 and also directly accessing the battery pack data 312 in the battery pack memory 318.

In another example, the accessory 304 may include an agent 336 that is configured to provide the battery pack data 312 and the accessory data 314 to the application 310. The agent 336 may provide the battery pack data 312 and the accessory data 314 to the application 310 in response to a request from the application 310. Alternatively, the agent 336 may provide the battery pack data 312 and the accessory data 314 to the application 310 without first receiving a request from the application 310. For instance, the agent 336 may be configured to periodically provide the battery pack data 312 and the accessory data 314 to the application 310.

The application 310 may communicate the battery pack data 312 and the accessory data 314 to the user of the mobile device 302. For example, the application 310 may be configured to cause the battery pack data 312 and the accessory data 314 to be displayed on a display screen 338 of the mobile device 302. The application 310 may also communicate the battery pack data 312 and the accessory data 314 to one or more other interested entities. For example, the application 310 may also be configured to cause the battery pack data 312 and the accessory data 314 to be sent to a process management server 340. The process management server 340 shown in FIG. 3 may include some or all of the components and/or characteristics that were described above in connection with the process management servers 25a-b shown in FIG. 1.

In addition to causing the battery pack data 312 and the accessory data 314 to be sent to the process management server 340, the application 310 may also cause time and location data 342 that is associated with the battery pack data 312 and the accessory data 314 to be sent to the process management server 340. The time and location data 342 associated with a particular set of battery pack data 312 and/or accessory data 314 may indicate (i) the time at which the application 310 obtained the battery pack data 312 and/or the accessory data 314 from the accessory 304, and/or (ii) the location of the mobile device 302 when the application 310 obtained the battery pack data 312 and/or the accessory data 314 from the accessory 304. In an example, the location may be expressed in terms of a geographical location, such as Global Positioning System (GPS) coordinates. In another example, the accessory may be expressed in terms of a geographical location within the coverage area of a local area network (e.g., the LAN 15 shown in FIG. 1) such a floor of a building, a wing of a building, or a room within a building.

The mobile device 302 includes a processor 364 and memory 344 in electronic communication with the processor 364. The application 310 may be executable by the processor 364 to perform the operations that were described above in connection with the application 310.

The accessory 304 may also include a processor 346. The accessory memory 316 may be in electronic communication with the processor 346. The agent 336 may be executable by the processor 346 to perform the operations that were described above in connection with the agent 336.

Figure 4:
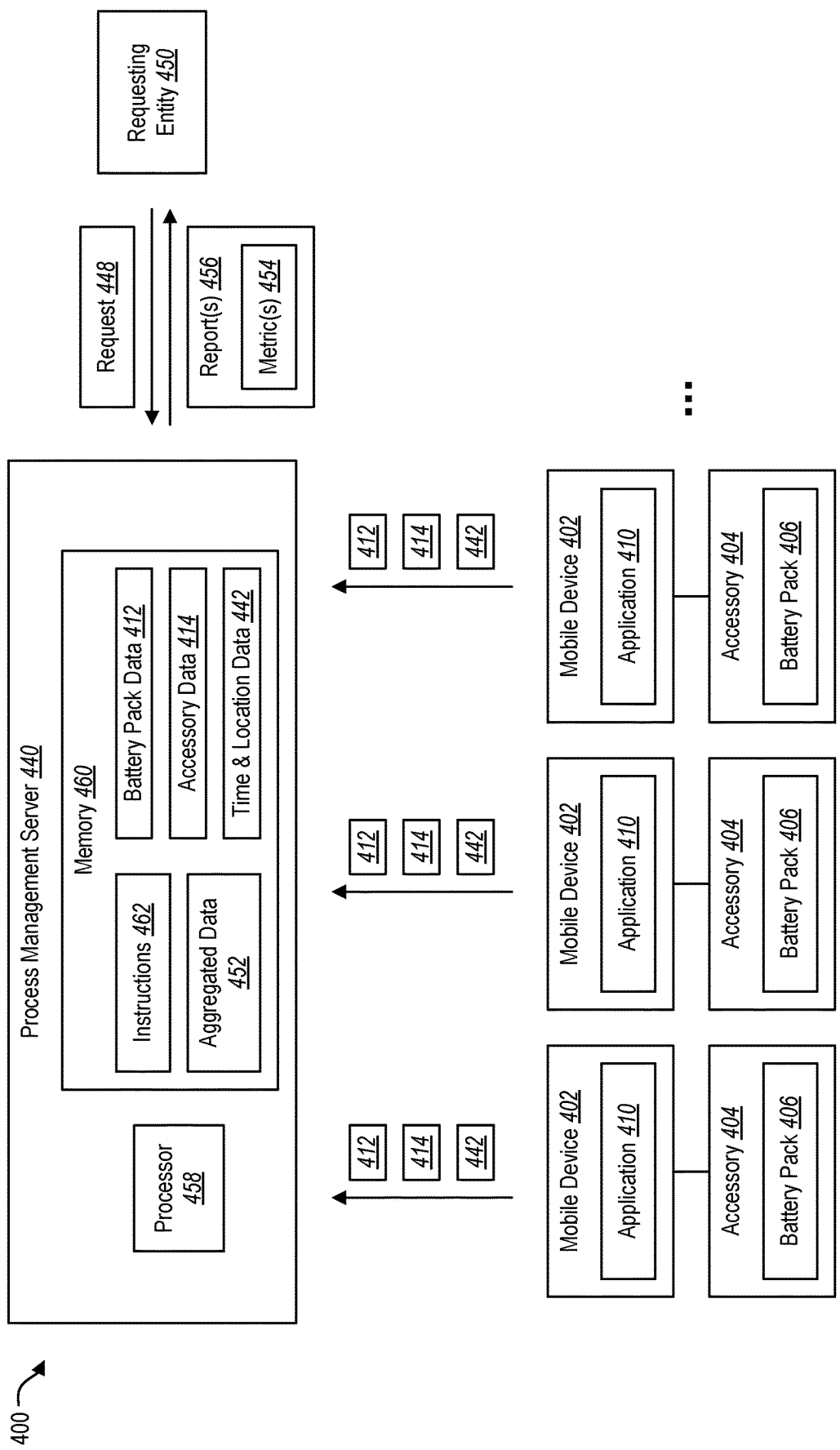
FIG. 4 illustrates an example of a system in which a process management server receives battery data, accessory data, and time and location data from a plurality of applications on a plurality of mobile devices.

FIG. 4 illustrates an example of a system 400 that includes a process management server 440 in electronic communication with a plurality of mobile devices 402. Each of the mobile devices 402 may be connected to an accessory 404. Each of the mobile devices 402 includes an application 410 that is configured to operate similarly to the application 310 that was described above in connection with FIG. 3. Thus, the application 410 on a particular mobile device 402 may be configured to (i) obtain battery pack data 412 and accessory data 414 from the accessory 404 to which the mobile device 402 is attached, (ii) cause the battery pack data 412 and the accessory data 414 to be sent to the process management server 440, and (iii) cause time and location data 442 that is associated with the battery pack data 412 and the accessory data 414 to be sent to the process management server 440. The process management server 440 may receive the battery pack data 412, the accessory data 414, and the time and location data 442 from the plurality of applications 410 running on the plurality of mobile devices 402.

The process management server 440 may make at least some of the battery pack data 412, the accessory data 414, and the time and location data 442 available to interested entities. For example, in response to receiving a request 448 for data that is related to the accessories 404 and/or the battery packs 406 used by the mobile devices 402, the process management server 440 may provide at least some portion of the battery pack data 412, the accessory data 414, and the time and location data 442 to the requesting entity 450. This information may be provided in the form of one or more reports 456.

The process management server 440 may process the battery pack data 412, the accessory data 414, and/or the time and location data 442 in order to determine additional information related to the accessories 404 and/or the battery packs 406 contained in the accessories 404. For example, the process management server 440 may aggregate the battery pack data 412, the accessory data 414, and/or the time and location data 442 that is received from the applications 410, thereby creating aggregated data 452. The process management server 440 may also determine one or more metrics 454 that are related to the aggregated data 452. Some examples of metrics 454 that may be determined include an average battery age and an average value for a battery health indicator.

The process management server 440 may also provide one or more reports 456 that include the metric(s) 454. The report(s) 456 may include one or more visual representations of the metric(s) 454.

The process management server 440 includes a processor 458, memory 460 in electronic communication with the processor 458, and instructions 462 stored in the memory 460. The instructions 462 may be executable by the processor 458 to perform the operations that were described above in connection with the process management server 440.

Figure 5:
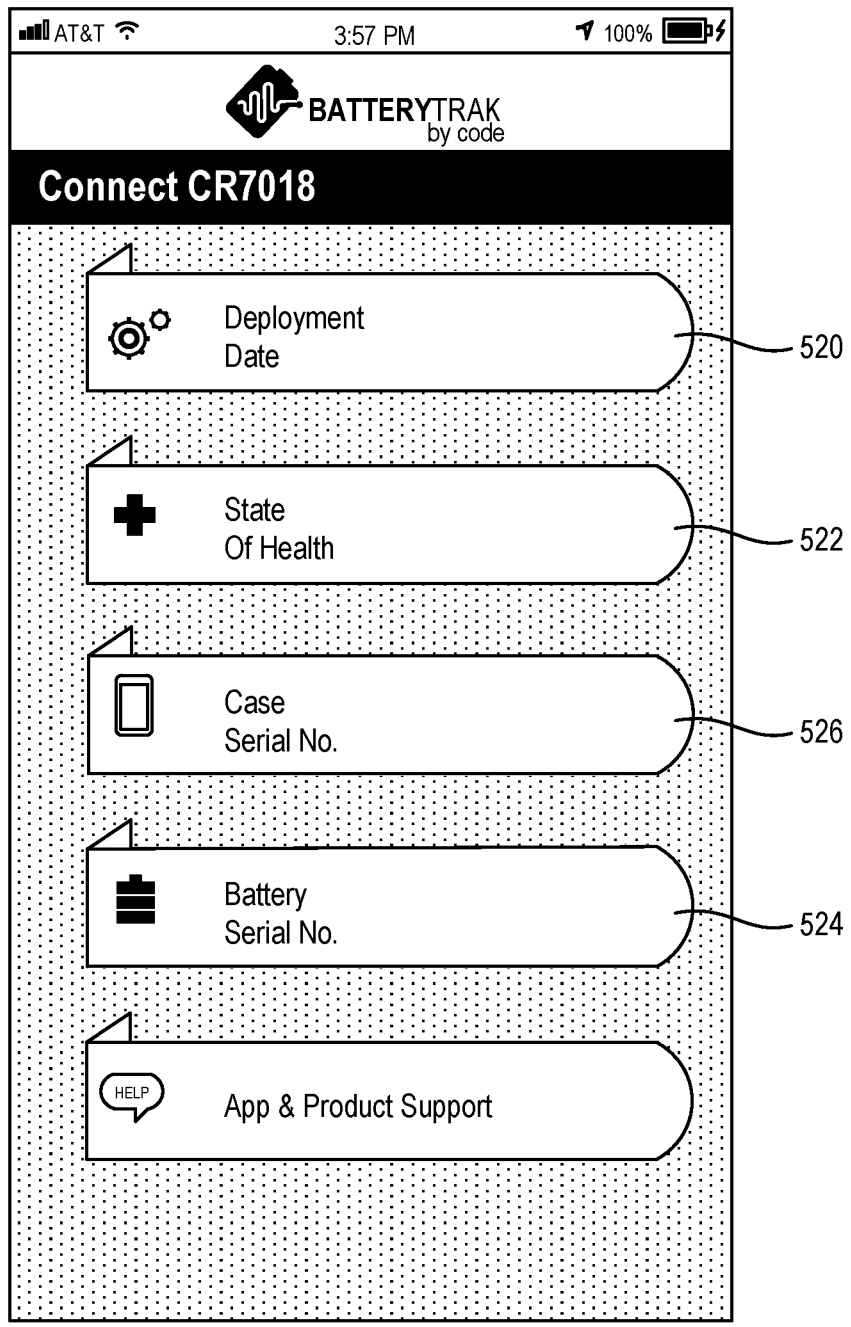
FIG. 5 illustrates an example of a user interface that may be displayed by an application on a mobile device.

FIG. 5 illustrates an example of a user interface 580 that may be displayed by an application 310 on a mobile device 302 in accordance with the present disclosure. As discussed above, an application 310 may be configured to cause battery pack data 312 and accessory data 314 to be displayed on a display screen 338 of the mobile device 302. FIG. 5 shows examples of battery pack data 312 that may be displayed, including a deployment date 520 of the battery pack 306, a battery health indicator 522, and a serial number 524 of the battery pack 306. FIG. 5 also shows an example of accessory data 314 that may be displayed, including a serial number 526 of the accessory 304.

Figure 6:
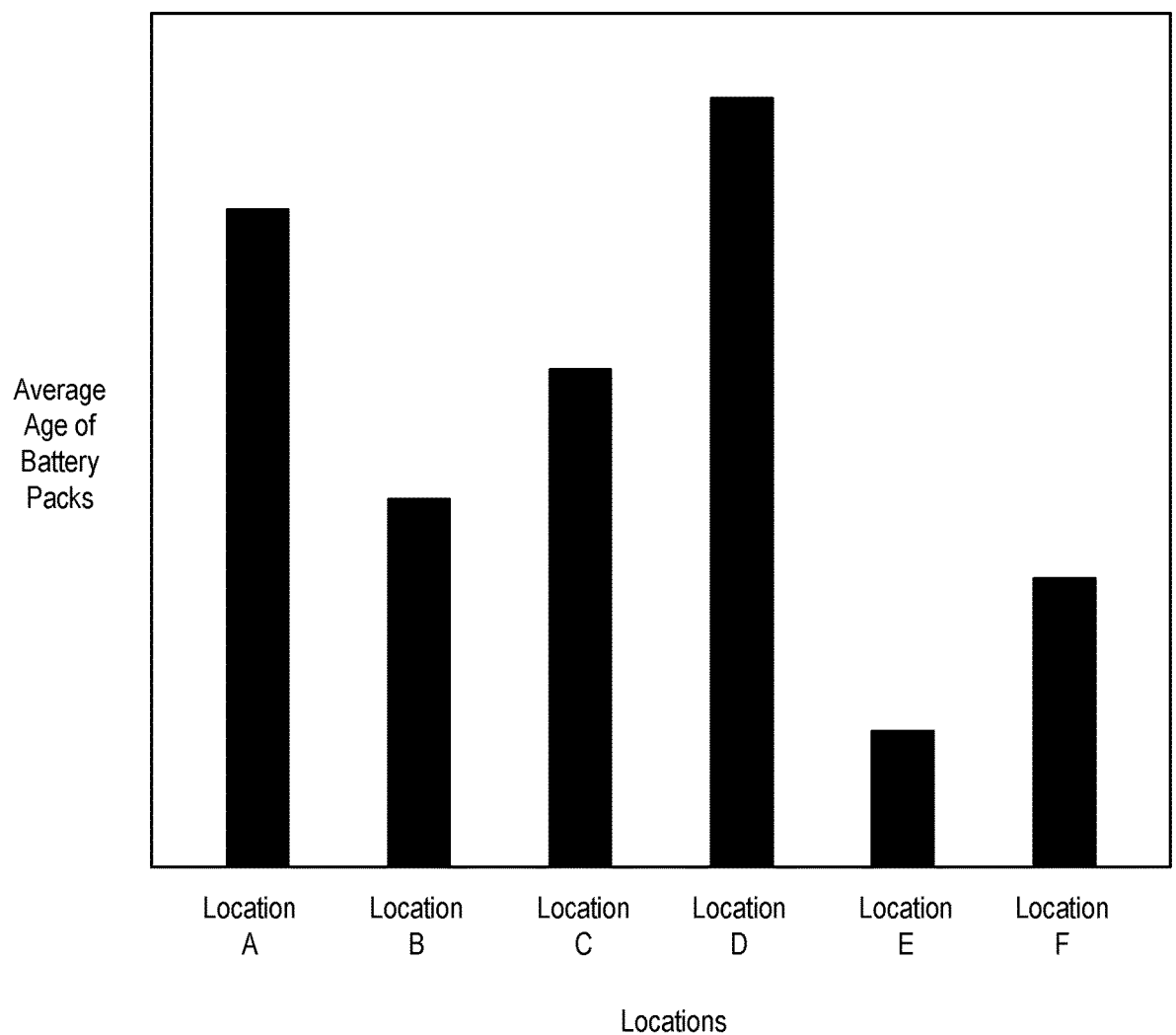
FIG. 6 illustrates an example of a visual representation of a metric that may be produced by a process management server.

As noted above in connection with FIG. 4, the process management server 440 may provide one or more reports 456 that include visual representations of one or more metrics 454. There are many different types of metrics 454 that may be determined in accordance with the present disclosure. As just one example, the process management server 440 may determine the average age of the battery packs 406 that are contained in a plurality of accessories 404 that are in use by individuals who work for an enterprise. FIG. 6 illustrates a visual representation of this type of metric 454, in the form of a bar graph 678.

In the depicted example, it is assumed that the enterprise has multiple locations, and the bar graph 678 indicates the average age of the battery packs at different locations. This type of bar graph 678 makes it simple for someone to quickly and easily see whether the battery packs 406 that are in use at a particular location are approaching a time when replacement should be considered. Similar bar graphs (or other types of visual representations) may be produced for other types of metrics associated with accessories 404 and/or battery packs 406.

Figure 7A:
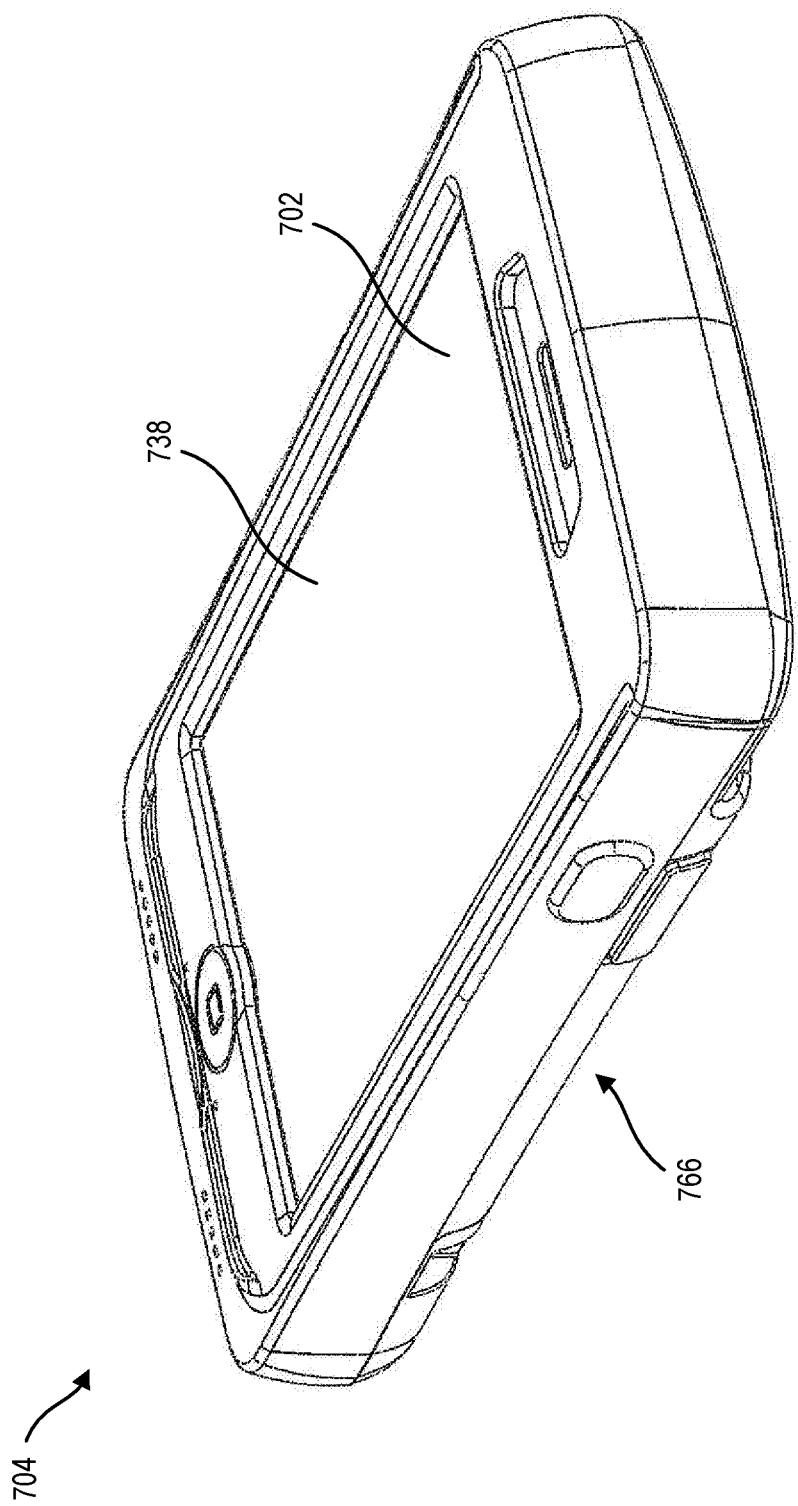
FIGS. 7A, 7B, and 7C illustrate an example of an accessory for a mobile device.
Figure 7B:
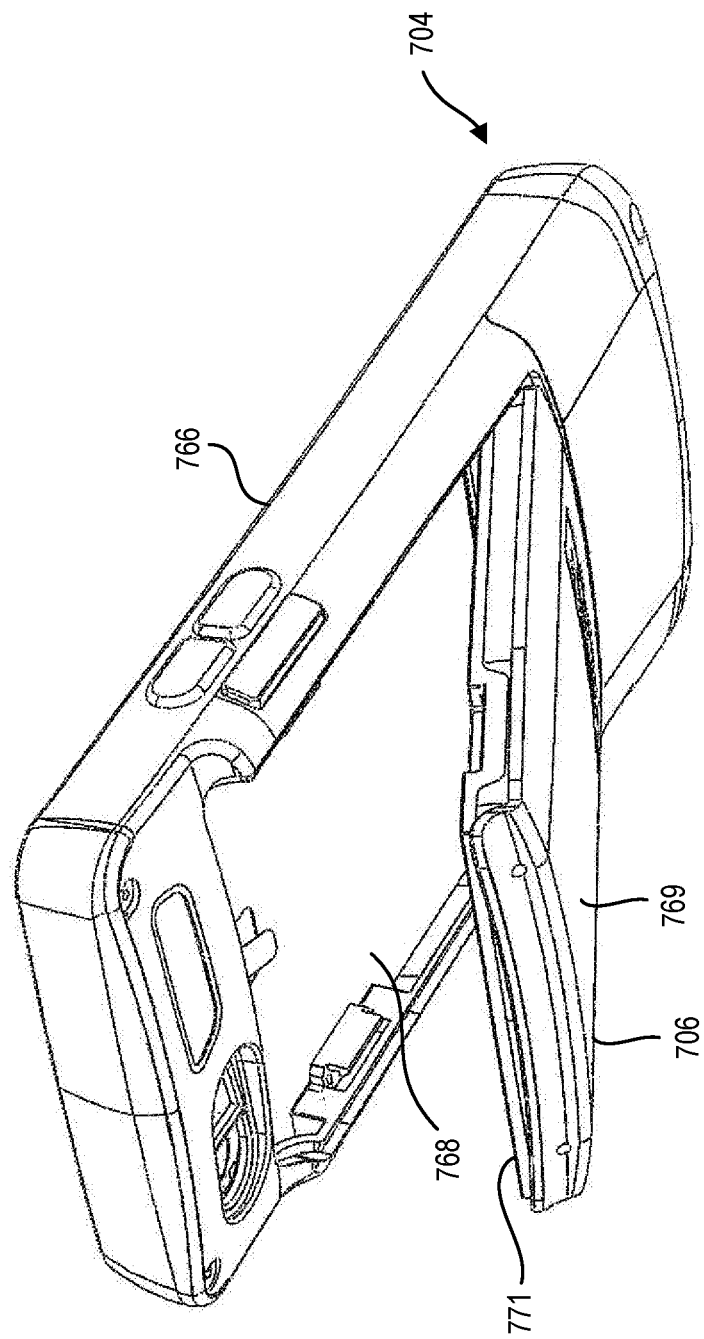

FIGS. 7A and 7B illustrate an example of an accessory 704 for a mobile device 702. The accessory 704 includes a protective case 766 that encloses the mobile device 702. The mobile device 702 is insertable into the protective case 766. When the mobile device 702 has been inserted into the protective case 766, the protective case 766 provides a relatively hard outer shell that encompasses the side portions and the back portion of the mobile device 702. The display screen 738 of the mobile device 702 remains visible, but may be protected by a clear cover, after the mobile device 702 has been inserted into the protective case 766.

As shown in FIG. 7B, the accessory 704 includes a battery pack 706 that provides auxiliary power to the mobile device 702. The battery pack 706 is replaceable without having to remove the mobile device 702 from the protective case 766. The protective case 766 includes a back side 768. The battery pack 706 includes an external backside 769 and an internal side 771 such that when the battery pack 706 is coupled to the accessory (with the internal side 771 adjacent to the external backside 769) the external backside 769 forms an external backside of the accessory 704. Replacing the battery pack 706 involves removing the battery pack 706 from the accessory 704 and inserting a new battery into the accessory 704.

Figure 7C:
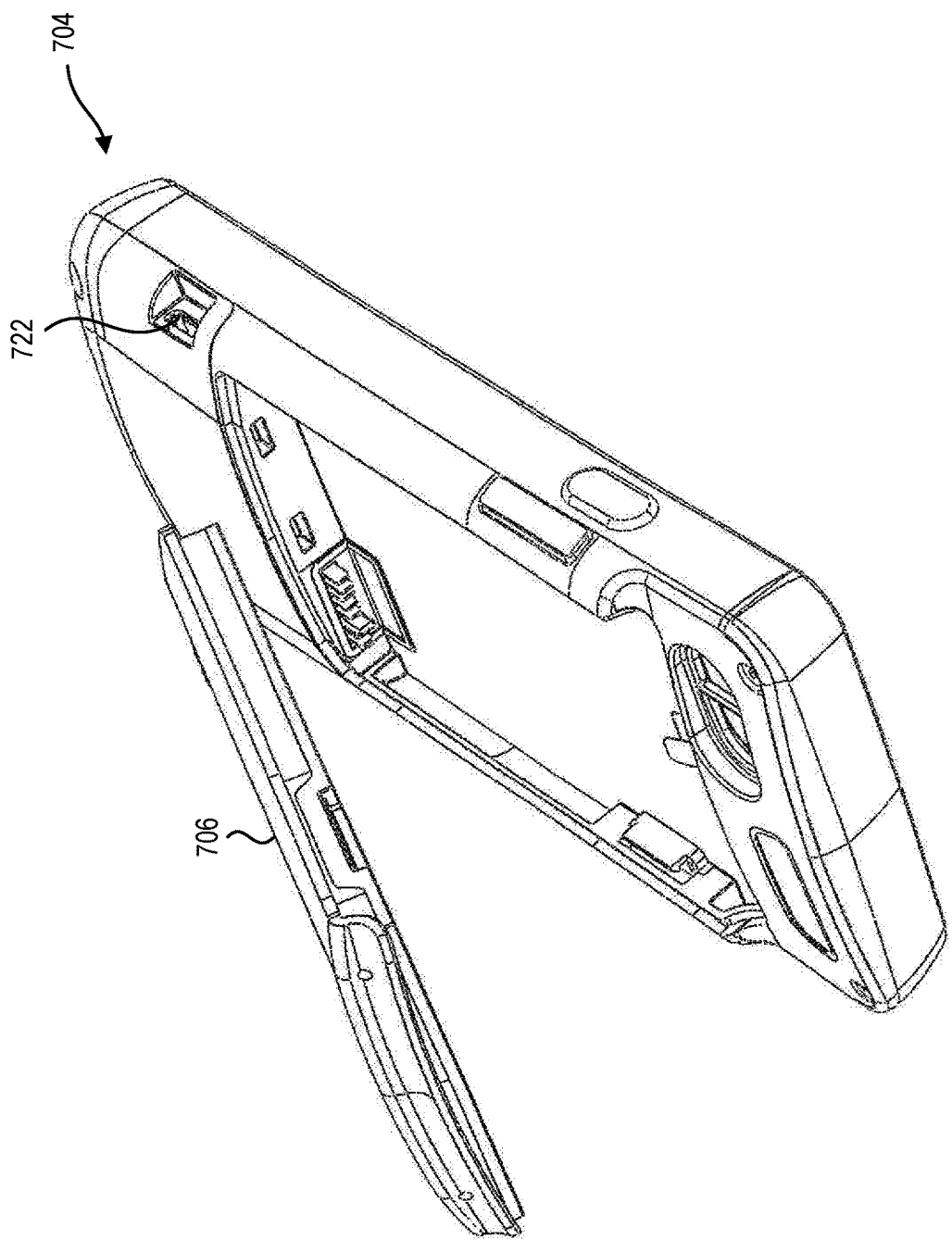

Referring to FIG. 7C, the accessory 704 includes a power interface 772 that enables the accessory 704 to be connected to a power source (e.g., an electrical outlet, a personal computer, a docking station, etc.) in order to charge the battery pack 706. The power interface 772 may include a type of USB interface (e.g., micro, mini, or standard). However because the battery pack 706 is removable, it can be charged separately from the accessory 704 in a single or multiday charger.

Figure 8:
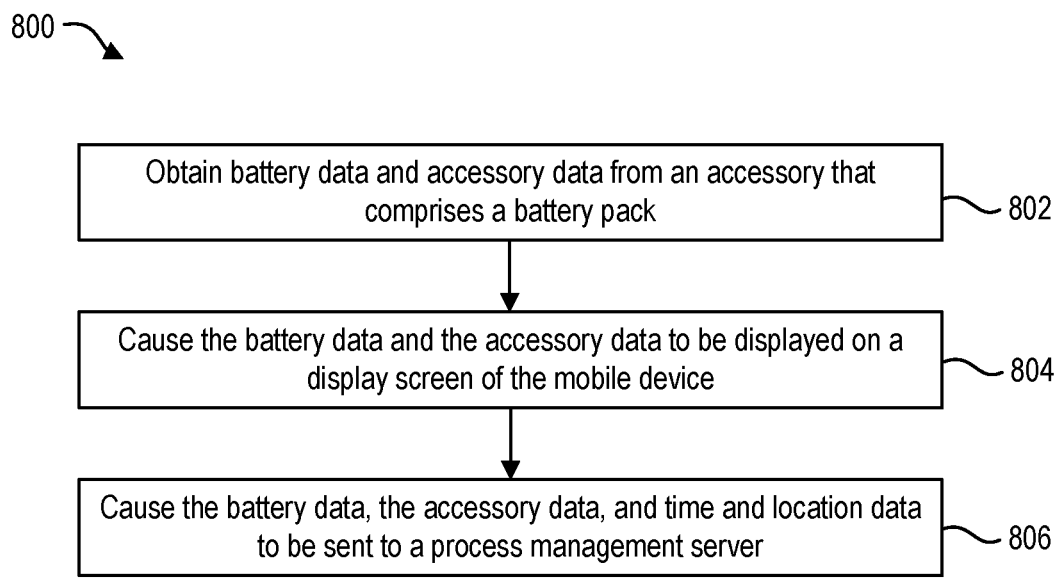
FIG. 8 illustrates an example of a method that may be performed by an application on a mobile device.

FIG. 8 illustrates an example of a method 800 that may be performed by an application 310 on a mobile device 302 in accordance with the present disclosure. As discussed above, the mobile device 302 may be electrically coupled to an accessory 304 that includes a battery pack 306.

In step 802 of the method 800, the application 310 obtains battery data 312 and accessory data 314 from the accessory 304. As discussed above, the application 310 may be capable of directly accessing the accessory data 314 in the accessory memory 316 and also directly accessing the battery pack data 312 in the battery pack memory 318. Alternatively, the application 310 may obtain the battery data 312 and the accessory data 314 via interactions with an agent 336 on the accessory 304.

In step 804 of the method 800, the application 310 causes the battery data 312 and the accessory data 314 to be displayed on a display screen 338 of the mobile device 302. The battery data 312 and the accessory data 314 may be displayed in a user interface such as the user interface 580 that was discussed above in connection with FIG. 5.

In step 806 of the method 800, the application 310 causes the battery data 312 and the accessory data 314 to be sent to a process management server 340. Time and location data 342 may also be sent to the process management server 340 along with the battery data 312 and the accessory data 314. As discussed above, the time and location data 342 may indicate when the application 310 obtained the battery data 312 and the accessory data 314 from the accessory 304, as well as the location of the mobile device 302 on which the application 310 is running.

Figure 9:
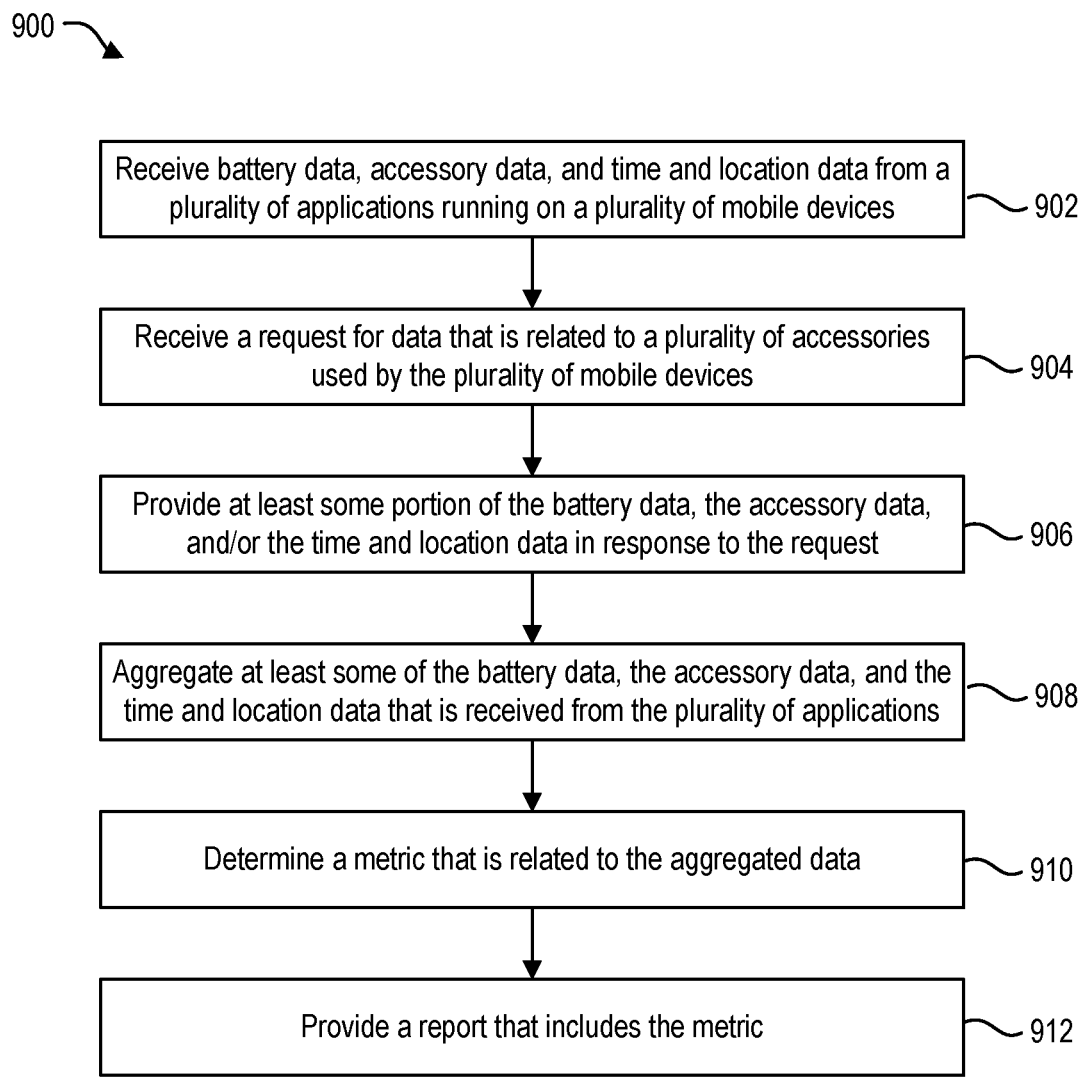
FIG. 9 illustrates an example of a method that may be performed by a process management server.

FIG. 9 illustrates an example of a method 900 that may be performed by a process management server 440 in accordance with the present disclosure. As discussed above, the process management server 440 may be in electronic communication with a plurality of applications 410 running on a plurality of mobile devices 402. Each of the mobile devices 402 may be connected to an accessory 404.

In step 902 of the method 900, the process management server 440 receives battery data 412, accessory data 414, and time and location data 442 from the plurality of applications 410. In an example, the plurality of applications 410 may periodically send the battery data 412, accessory data 414, and time and location data 442 to the process management server 440. In another example, each application 410 may be configured to send battery data 412, accessory data 414, and time and location data 442 to the process management server 440 whenever the battery data 412 and/or the accessory data 414 in the corresponding accessory 404 changes.

In step 904 of the method 900, the process management server 440 receives a request 448 for data that is related to a plurality of accessories 404 used by the plurality of mobile devices 402. In step 906 of the method 900, the process management server 440 provides at least some portion of the battery data 412, the accessory data 414, and/or the time and location data 442 in response to the request 448.

In step 908 of the method 900, the process management server 440 aggregates at least some of the battery data 412, the accessory data 414, and the time and location data 442 that is received from the plurality of applications 410. In step 910 of the method 900, the process management server 440 determines a metric 454 that is related to the aggregated data 452. Many different types of metrics 454 may be determined in accordance with the present disclosure, such as an average battery age and an average value for a battery health indicator. In step 912 of the method 900, the process management server 440 provides a report 456 that includes the metric 454. The report 456 may include a visual representation of the metric 454.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An accessory for a mobile device, the mobile device comprising an application, the accessory comprising:
    a battery pack comprising a battery, battery pack memory, and battery data stored in the battery pack memory, wherein the battery is an auxiliary power source for the mobile device when the accessory is electrically coupled to the mobile device, and wherein the battery data comprises a deployment date of the battery pack, a battery health indicator, and a serial number of the battery pack;
    accessory memory;
    accessory data comprising a unique alphanumeric identifier associated with the accessory stored in the accessory memory, wherein the accessory data including the unique alphanumeric identifier associated with the accessory and the battery data are obtained by the application on the mobile device when the accessory is electrically coupled to the mobile device; and
    an agent stored in the accessory memory, the agent being executable by one or more processors to provide the battery data and the accessory data to the application.

2. The accessory of claim 1, wherein the accessory data comprises a serial number of the accessory.

3. The accessory of claim 1, wherein:
    the battery pack further comprises a battery pack power and data connector; and
    the accessory further comprises an accessory power and data connector that is configured to be coupled to the battery pack power and data connector.

4. The accessory of claim 1, wherein:
    the mobile device further comprises a mobile device power and data connector; and
    the accessory further comprises an accessory power and data connector that is configured to be coupled to the mobile device power and data connector.

5. The accessory of claim 1, wherein the application directly accesses the battery data in the battery pack memory and directly accesses the accessory data in the accessory memory.

6. The accessory of claim 1, wherein:
    the accessory comprises a protective case that encloses the mobile device; and
    the battery in the battery pack is replaceable without having to remove the mobile device from the protective case.

7. The accessory of claim 1, wherein the battery data further comprises an indication of when the battery within the battery pack has completed a predefined number of charge/discharge cycles.

8. A mobile device, comprising:
    one or more processors;
    memory in electronic communication with the one or more processors; and
    an application stored in the memory, the application being executable by the one or more processors to:
        obtain battery data and accessory data from an agent within an accessory that comprises a battery pack, wherein the battery data comprises a deployment date of the battery pack, a battery health indicator, and a serial number of the battery pack;
        cause the battery data and the accessory data to be displayed on a display screen of the mobile device;
        cause the battery data and the accessory data to be sent to a process management server whenever at least one of the battery data or the accessory data changes; and
        cause time and location data associated with the battery data and the accessory data to be sent to the process management server, wherein the time and location data associated with a set of battery data and accessory data indicates:
            a time at which the application obtained the battery data and the accessory data from the accessory; and
            a location of the mobile device when the application obtained the battery data and the accessory data from the accessory.

9. The mobile device of claim 8, wherein:
    the battery pack is an auxiliary power source for the mobile device;
    the battery pack comprises battery pack memory; and
    the application is further executable by the one or more processors to receive user input comprising the deployment date of the battery pack and cause the deployment date to be written to the battery pack memory, wherein the deployment date indicates when the battery pack went into service in the accessory.

10. The mobile device of claim 8, wherein the accessory data comprises a serial number of the accessory.

11. The mobile device of claim 8, wherein the location of the mobile device is expressed as a geographical location within a coverage area of a local area network.

12. A mobile device, comprising:
    one or more processors;
    memory in electronic communication with the one or more processors; and
    an application stored in the memory, the application being executable by the one or more processors to:
        obtain battery data and accessory data from an accessory that comprises a battery pack, wherein the battery data comprises a deployment date and a serial number of the battery pack, and wherein the accessory data comprises a unique alphanumeric identifier associated with the accessory;
        cause the deployment date, the serial number, and the unique alphanumeric identifier to be displayed on a display screen of the mobile device; and cause the battery data, the accessory data, and time and location data to be sent to a process management server.

13. The mobile device of claim 12, wherein the time and location data associated with a set of battery data and accessory data indicates:
   a time at which the application obtained the battery data and the accessory data from the accessory; and
   a location of the mobile device when the application obtained the battery data and the accessory data from the accessory.

14. The mobile device of claim 13, wherein the location of the mobile device is expressed as a geographical location within a coverage area of a local area network.

15. The mobile device of claim 12, wherein the battery data further comprises an indication of when a battery within the battery pack has completed a predefined number of charge/discharge cycles.

* * * * *